United States Patent
Tanase et al.

(10) Patent No.: US 6,695,342 B2
(45) Date of Patent: Feb. 24, 2004

(54) HEAD PROTECTING AIRBAG DEVICE

(75) Inventors: Toshinori Tanase, Aichi-ken (JP); Katsunobu Sakane, Aichi-ken (JP); Shinji Oguchi, Aichi-ken (JP)

(73) Assignee: Toyoda Gosei, Co., Ltd., Aichi-ken (JP)

(*) Notice: Subject to any disclaimer, the term of this patent is extended or adjusted under 35 U.S.C. 154(b) by 45 days.

(21) Appl. No.: 10/152,918

(22) Filed: May 23, 2002

(65) Prior Publication Data

US 2002/0180192 A1 Dec. 5, 2002

(30) Foreign Application Priority Data

Jun. 1, 2001 (JP) ......................................... 2001-167266

(51) Int. Cl.[7] .............................................. B60R 21/22
(52) U.S. Cl. .................................................... 280/730.2
(58) Field of Search ........................... 280/730.2, 730.1, 280/728.2

(56) References Cited

U.S. PATENT DOCUMENTS

| 5,265,903 A | 11/1993 | Kuretake et al. | |
| 6,386,581 B1 | * 5/2002 | Ohno | ......................... 280/735 |
| 2002/0175504 A1 | * 11/2002 | Tanase et al. | ............. 280/730.2 |

FOREIGN PATENT DOCUMENTS

| DE | 26 28 815 | 1/1978 | |
| DE | 43 37 656 | 5/1995 | |
| DE | 197 45 872 | 4/1999 | |
| DE | 10115064 A1 | * 11/2002 | ........... B60R/21/16 |
| GB | 2 345 669 | 7/2000 | |
| JP | WO 98/19894 | 5/1998 | |
| JP | 2002067863 A | * 3/2002 | ........... B60R/21/22 |
| JP | 2002193065 A | * 7/2002 | ........... B60R/21/22 |

* cited by examiner

Primary Examiner—Son T Nguyen
(74) Attorney, Agent, or Firm—Posz & Bethards, PLC

(57) ABSTRACT

A head protecting airbag device comprising an airbag folded and housed above the upper edge of a window inside of a vehicle and expanded while being extended to cover the inner side of the window when it admits an inflating gas. The airbag includes a body portion and an extension portion. The body portion covers the inner side of a side window positioned on the side face of the vehicle. The extension portion is arranged on at least the front end of the body portion, and extends on the inner side generally perpendicular to the side window. Moreover, the extension portion is formed into a sheet shape having flexibility such that it can be arranged in front of a passenger upon completion of the expansion of the airbag. Moreover, the body portion is fixed at its upper edge upon completion of the expansion on the body side while allowing the lower edge upon completion of the expansion to move generally perpendicular to the side window. The extension portion is fixed at its leading end removed from the body portion to the vehicle body and is housed in a roof portion over the portion of the cabin in front of the passenger such that it can protrude downward along with the body portion housed above the upper edge of the side window. In this head protecting airbag device, the body portion of the airbag can be smoothly arranged between the passenger and the side window by moving its lower edge. Moreover, the extension portion can protect the passenger moving forward.

16 Claims, 11 Drawing Sheets

HEAD PROTECTING AIRBAG DEVICE

This application claims priority from Japanese patent application of Tanase et al, filed Jun. 1, 2001, No2001-167266, the complete disclosure of which is hereby incorporated into the present application by this reference.

BACKGROUND OF THE INVENTION

1. Field of the Invention

The present invention relates to a head protecting airbag device for expanding an airbag while extending it at the time of a rollover (e.g., a turnover or a side roll) or a side collision of a vehicle. The airbag of the head protecting airbag device is folded up and housed above the upper edge of a window inside of the vehicle. Moreover, the airbag expands while extending to cover the inner side of the window when it admits an inflating gas.

2. Description of Related Art

The airbag device of the prior art for covering the window on the inner side of a vehicle with an airbag expanded is disclosed in International Laid-Open No. WO98/19894. In this airbag device, a folded airbag is housed above the upper edge of a side window positioned on the side face of the vehicle. At a predetermined time, moreover, an inflating gas flows from an inflator into the airbag so that the airbag expanded covers the inner side of the side window.

Moreover, the airbag having completed its expansion is so tensed in the longitudinal direction of the vehicle that it may not be moved to the outside of the vehicle by the passenger.

However, the following problems have occurred when such airbag is employed in the head protecting airbag device which is activated when a rollover (e.g., a turnover or a side roll) of the vehicle is predicted.

During the rollover of the vehicle, more specifically, it is unavoidable that the upper half of the passenger is seriously rocked in the transverse directions as the vehicle turns. When the airbag is extended and expanded with the passenger's head portion being extremely close to the side window, for example, the airbag may be arranged not between the head portion and the side window but closer to the center of the cabin than the head portion inside of the vehicle. If, in this case, the airbag is longitudinally tensed as the expansion of the airbag is completed, it cannot be arranged between the passenger's head portion and the side window. On the contrary, the airbag pushes the head portion onto the side window.

SUMMARY OF THE INVENTION

The present invention contemplates to solve the above-specified problems. In short, the invention has an object to provide a head protecting airbag device which can arrange the expanded airbag smoothly between the passenger and the side window even if the passenger is close to the side window.

According to a first aspect of the present invention, there is provided a head protecting airbag device comprising an airbag folded and housed above the upper edge of a window inside of a vehicle and expanded while being extended to cover the inner side of the window when it admits an inflating gas. The airbag includes a body portion and an extension portion. The body portion covers the inner side of a side window positioned on the side face of the vehicle. The extension portion is arranged on at least the front side of the body portion, and extends on the inner side of the vehicle body generally perpendicularly to the side window.

Moreover, the extension portion is formed into such a sheet shape having flexibility that it can be arranged in front of a passenger upon completion of the expansion of the airbag. Moreover, the body portion upon completion of the expansion fixes its upper edge on the body side while allowing the lower edge to move generally perpendicular to the side window upon completion of the expansion. The extension portion is fixed at its leading edge (the edge removed from the airbag body portion) on the vehicle body and is housed in a roof portion over the front side of the passenger such that it can protrude downward along with the body portion housed above the upper edge of the side window.

In the head protecting airbag device according to the first aspect of the invention, the body portion expands while extending downward from the upper edge of the side window positioned on the side face of the vehicle thereby to cover the inner side of the side window, when the airbag admits the inflating gas. Moreover, the extension portion is pulled by the body portion to protrude downward from the roof portion acting as the housing so that it is arranged in front of the passenger.

Even if the body portion of the airbag is arranged closer to the center of the cabin than the head of the passenger which is close to the side window at the beginning of completion of the expansion, the lower edge of the body portion can move generally at a right angle with respect to the side window. Therefore, the airbag having completed the expansion does not push the passenger forcibly onto the side window. If the vehicle makes a rollover, a transverse movement or a side collision, on the contrary, the passenger may move away from the side window and toward the center of the vehicle. If the airbag body portion then moves its lower edge inward and then returns it outward, it can enter into the space between the passenger and the side window. If the airbag body portion is then sandwiched between the passenger's head portion and the side window, the head portion is properly restrained (or protected) by the airbag body portion.

Here, the extension portion's leading edge apart from the body portion is fixed on the body side of the vehicle. However, the extension portion has flexibility. Therefore, the airbag body portion having completed its expansion can flex the extension portion to rock the lower edge like a free end. As a result, the body portion can smoothen the inward movement and the outward returning movement of the lower edge.

Upon completion of the expansion of the airbag, moreover, the airbag extension portion is arranged in front of the passenger. This extension portion is fixed at its leading end portion apart from the body portion on the vehicle body side and is connected at its root portion to the airbag body portion. Therefore, it is hard for the extension portion to move forward. As a result, the extension portion can restrain (or protect) the passenger's head properly even if when it is on the inner side of the airbag body portion it moves forward.

In the head protecting airbag device according to the first aspect of the invention, therefore, even if the passenger is close to the side window, the airbag having expanded can be smoothly arranged between the passenger and the side window. Even if the passenger moves forward, moreover, the airbag can retrain the passenger smoothly.

In this head protecting airbag device of the first aspect, it is desired that the extension portion is formed to extend from the whole front vertical end of the body portion.

With this construction, the vicinity of the boundary between the extension portion and the body portion can be a wide area. Therefore, the extension portion can retain an area as wide as possible, thereby to improve its ability to retrain the passenger moving forward.

In this head protecting airbag device of the first aspect, moreover, the extension portion may be formed into a mesh shape for retaining a forward visibility.

With this construction, the extension portion is enabled to retain the forward visibility by the mesh shape even if the airbag completes its extension and expansion so that the extension portion is arranged in front of the passenger. Therefore, the passenger can grasp the surrounding situation easily. Here, this mesh-shaped structure may include a net shape or a lattice shape so that the extension portion can restrain the passenger moving forward and can retain the forward visibility.

According to a second aspect of the invention, there is provided a head protecting airbag device comprising an airbag folded and housed above the upper edge of a window inside of a vehicle and expanded while being extended to cover the inner side of the window when it admits an inflating gas. The airbag includes a body portion and an extension portion. The body portion covers the inner side of a side window positioned on the side face of the vehicle. The extension portion has flexibility and is arranged on at least one longitudinal end side of the body portion, and extends on the inner side generally perpendicular to the side window. Moreover, the extension portion is fixed at its leading end portion opposite from the airbag body portion. Moreover, the body portion is fixed at its upper edge upon completion of the expansion on the body side, and allows the lower edge upon completion of the expansion to move generally perpendicular to the side window. The body portion has a smaller length in the longitudinal direction at the time when it admits the inflating gas than that when it is in an extended but non-expanded state.

In the head protecting airbag device according to the second aspect of the invention, too, the body portion expands while extending downward from the upper edge of the side window positioned on the side face of the vehicle thereby to cover the inner side of the side window, when the airbag admits the inflating gas.

Even if the body portion of the airbag is arranged closer to the center of the cabin than the head of the passenger which is close to the side window at the beginning of completion of the expansion, the lower edge of the body portion can move generally at a right angle with respect to the side window. Therefore, the airbag having completed the expansion does not push the passenger forcibly onto the side window. If the vehicle makes a rollover, a transverse movement or a side collision, on the contrary, the passenger may move away from the side window inward of the vehicle. When the airbag body portion then moves its lower edge inward and then returns it outward, it can enter into the space between the passenger and the side window. If the airbag body portion is then sandwiched between the passenger's head portion and the side window, the head portion is properly restrained (or protected) by the airbag body portion.

It is natural that the extension portion of the airbag retains the flexibility even if it is fixed at its leading end portion apart from the body portion on the body side of the vehicle. Therefore, the airbag body portion having completed its expansion can rock at its lower edge freely. As a result, the body portion can have smooth inward and outward movement of the lower edge.

Moreover, the airbag body portion expands to reduce its longitudinal length from that of the extended but non-expanded state. Moreover, the extension portion extending from at least one longitudinal end of the body portion is fixed at its leading end portion away from the body portion and on the vehicle body side. Therefore, the body portion and the extension portion upon completion of the expansion take such a shape similar to about one quarter of a cylinder so as to enclose the passenger. As a result, the airbag body portion arranged on the outer side of the passenger is difficult to move out of the vehicle even it is pushed by the passenger moving outward. Moreover, the passenger is properly restrained (or protected) on the inner side of the body portion or the extension portion of the airbag.

In the head protecting airbag device according to the second aspect of the invention, therefore, even if the passenger is close to the side window, the airbag having expanded can be smoothly arranged between the passenger and the side window. Even if the airbag is moved by the passenger moving outward, moreover, it can retrain the passenger properly.

In this head protecting airbag device of the second aspect, it is desired that extension portions of the airbag are arranged on the two longitudinal ends of the body portion.

With this construction, the body portion having completed its expansion is supported by the extension portions extending inward from the body portion's two longitudinal ends. Thereby, it is harder for the body portion arranged on the outer side of the passenger to move outward even if it is pushed by the passenger moving outward. As a result, the body portion can improve its ability to retrain the passenger.

In the head protecting airbag device of the second aspect, moreover, it is desired that if the vehicle is constructed to have the side window on each of the two transverse sides, the airbag body portion is constructed to cover at least one of the transverse side windows of the vehicle.

In case the head protecting airbag device is mounted on a vehicle such as a single-cab vehicle having one row of seats, in which the side windows are arranged individually on the two transverse side faces, the airbag body portion may be arranged to cover at least one side window in the transverse direction of the single-cab vehicle.

In the head protecting airbag device of the second aspect, moreover, in case the airbag device is mounted on the vehicle which is constructed with a pillar portion extending generally vertically and with side windows in front of and at the back of the pillar portion, the airbag body portion may be constructed to cover the side windows and also the pillar portion. In this case, the airbag body portion is also restrained by the pillar portion from moving to the outside of the vehicle. Therefore, the it is harder for the airbag body portion to move to the outside of the vehicle even if it is pushed by the passenger moving outward.

In the head protecting airbag device of the second aspect, moreover, it is desired that the body portion includes a gas inflow portion for admitting the inflating gas, and that the gas inflow portion is constructed to have a plurality of expansion portions juxtaposed longitudinally for inflating in vertical rod shapes. With this construction, the body portion can easily have a great amount of shrinkage in the longitudinal direction when expanding. Moreover, the body portion can be better prevented from moving outward.

According to a third aspect of the invention, there is provided a head protecting airbag device comprising an airbag folded and housed above the upper edge of a window inside of a vehicle and expanded while being extended to cover the inner side of the window when it admits an inflating gas. The airbag includes a body portion and an extension portion. The body portion covers the inner side of a side window positioned on the side face of the vehicle. The extension portion is arranged on at least one longitudinal end of the body portion, and extends on the inner side generally perpendicular to the side window. Moreover, the extension portion has flexibility and is fixed at its leading end portion on the vehicle body. Moreover, the body portion is fixed at its upper edge to the vehicle body upon completion of the expansion, and allows the lower edge to then move generally perpendicular to the side window. When the airbag is housed, moreover, the body portion is housed such that it is covered with the roof head lining above the upper edge of the side window. On the other hand, the extension portion merged with the body portion is housed above the upper edge of a window adjoining the side window and covered with the roof head lining so that it can protrude downward.

In the head protecting airbag device according to the third aspect of the invention, too, the body portion expands while extending downward from the upper edge of the side window positioned on the side face of the vehicle thereby to cover the inner side of the side window, when the airbag admits the inflating gas.

Even if the body portion of the airbag is arranged closer to the center of the cabin than the head of the passenger which is close to the side window at the beginning of completion of the expansion, the lower edge of the body portion can move generally at a right angle with respect to the side window. Therefore, the airbag having completed the expansion does not push the passenger forcibly onto the side window. If the vehicle has a rollover, a transverse movement or a side collision, on the contrary, the passenger may move away from the side window to the center of the vehicle. When the airbag body portion then moves its lower edge inward and then returns outward, it can enter into the space between the passenger and the side window. If the airbag body portion is then sandwiched between the passenger's head portion and the side window, the head portion is properly restrained (or protected) by the airbag body portion.

It is natural that the extension portion of the airbag retains flexibility even if it is fixed at its leading end portion on the body side of the vehicle. Therefore, the airbag body portion having completed its expansion can rock its lower edge freely so that the body portion lower edge can be smoothened in both its inward movement and outward movement.

At the time of housing the airbag, moreover, the body portion is so housed that it is covered with the roof head lining covering the inner side of the roof portion above the upper edge of the side window. On the other hand, the extension portion is housed and covered with the roof head lining so that it can protrude downward to merge into the body portion above the upper edge of a window adjoining the side window. Therefore, even if the airbag is housed on the vehicle, the appearance by the inner side of the vehicle becomes good.

In the head protecting airbag device according to the third aspect of the invention, therefore, even if the passenger is close to the side window, the airbag having extended and expanded can be smoothly arranged between the passenger and the side window. Moreover, the airbag can be mounted with an excellent appearance on the vehicle.

In this head protecting airbag device of the third aspect, the extension portions may be arranged on the two longitudinal ends of the body portion, the front extension portion housed above the upper edge of the front window and the back extension portion housed above the upper edge of the rear window.

With this construction, upon completion of the expansion of the airbag, the three windows, i.e., the front, side and back windows on the inner side can be covered with the single airbag. As a result, according to this airbag device, the performance of the airbag to restrain (or protect) the passenger inside of the vehicle can be better improved while keeping the excellent appearance of the inner side of the vehicle.

Moreover, the head protecting airbag device of the invention can also be constructed in the following manner. Specifically, the body portion of the airbag is housed by covering it with a door portion. Moreover, the body portion extends by pushing and opening the door portion when it admits the inflating gas. The body portion is provided with a gas inflow portion for admitting the inflating gas. This gas inflow portion is constructed to include a gas distributing passage portion extending longitudinally on the upper edge of the body portion to distribute the inflating gas inflow longitudinally in the body portion. Moreover, the body portion is so fixed on the vehicle body that the gas distributing passage portion protrudes below the door portion upon completion of the expansion.

With this construction, upon completion of the expansion of the airbag body portion, the vicinity of the gas distributing passage portion having expanded can protrude below the door portion. Therefore, the body portion can rock its lower end portion easily. As a result, the body portion can have inward and outward movements of the lower edge that are smoother.

On the other hand, the head protecting airbag device of the invention may also be constructed in the following manner. Specifically, the body portion includes a gas inflow portion for admitting the inflating gas. Moreover, the extension portion is constructed to be housed by being covered with a door portion that can be opened by pushing. Moreover, the extension portion includes a gas inflow portion at its upper end extended from the gas inflow portion of the body portion for pushing and opening the door portion when it admits the inflating gas.

With this construction, when the airbag expands, the gas inflow portion of the extension portion pushes and opens the door portion covering the extension portion easily. As a result, the extension portion smoothly protrudes downward even if it is bent inward at the body portion.

DESCRIPTION OF THE PREFERRED EMBODIMENTS

Figure 1:
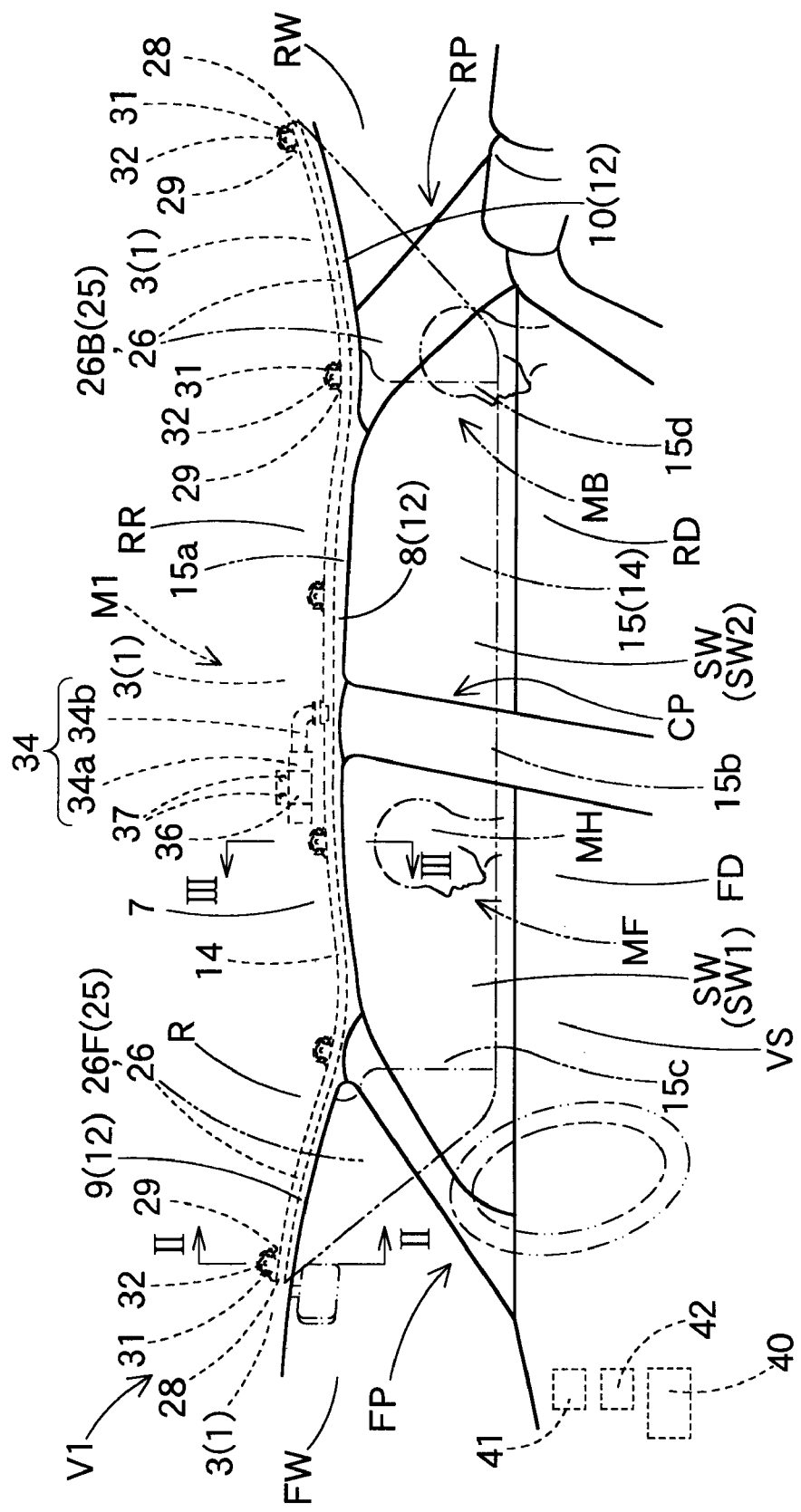
FIG. 1 is a front view taken from the inside of a vehicle and showing a head protecting airbag device according to a first embodiment of the present invention.

The invention will be described below by way of embodiments shown in the drawings. In addition, the invention is not limited to the embodiments. All modifications within the requirements of the claims and equivalents with respect to the requirements should be included in the scope of the claims.

A head protecting airbag device M1 of a first embodiment is constructed, as shown in FIG. 1, to include an airbag 14 and an inflator 34 for feeding an inflating gas to the airbag 14. This airbag 14 is folded and housed above the upper edges of the inner sides of side windows SW (SW1 and SW2) located on the side faces VS of a vehicle V1, front window FW, and rear window RW.

Figure 4:
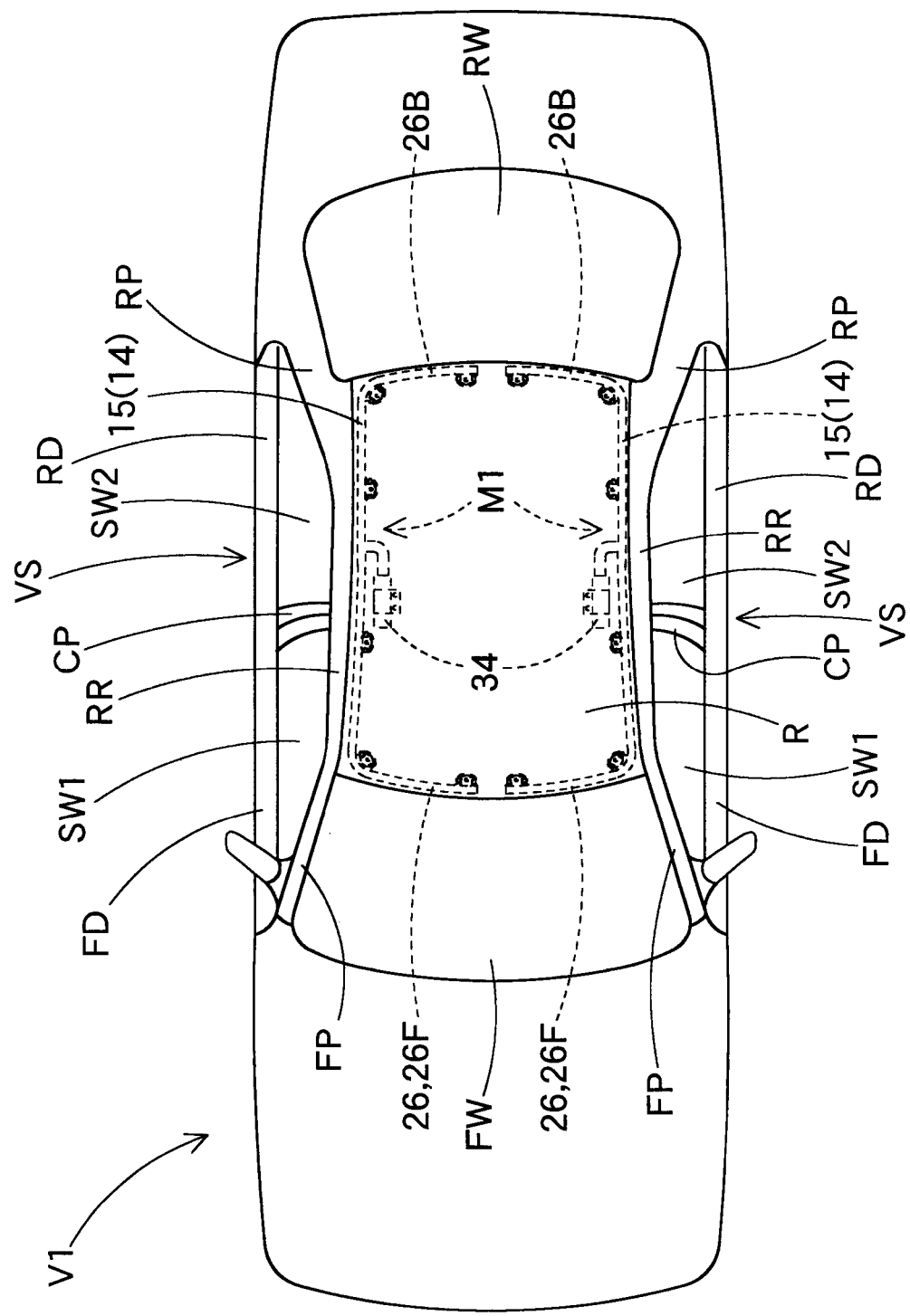
FIG. 4 is a top plan view of a vehicle, on which the head protecting airbag device of the first embodiment is mounted.

Here in this vehicle V1, the airbag devices M1 are mounted individually on the right and left sides VS, as shown in FIG. 4. These airbag devices M1 are made symmetric with respect to the center line in the longitudinal direction of the vehicle V1. Moreover, the following description will be made on the airbag device M1 on the right side of the vehicle V1 but omitted on the airbag device M1 on the left side of the vehicle V1.

On the other hand, the vehicle V1 has a center pillar portion CP arranged between a front pillar portion FP and a rear pillar portion RP. The side window SW is composed of the two side windows SW1 and SW2. These side windows SW1 and SW2 are longitudinally separated by the center pillar portion CP. Moreover, the side window SW1 is arranged in a front door FD, and the side window SW2 is arranged in a rear door RD.

Figure 5:
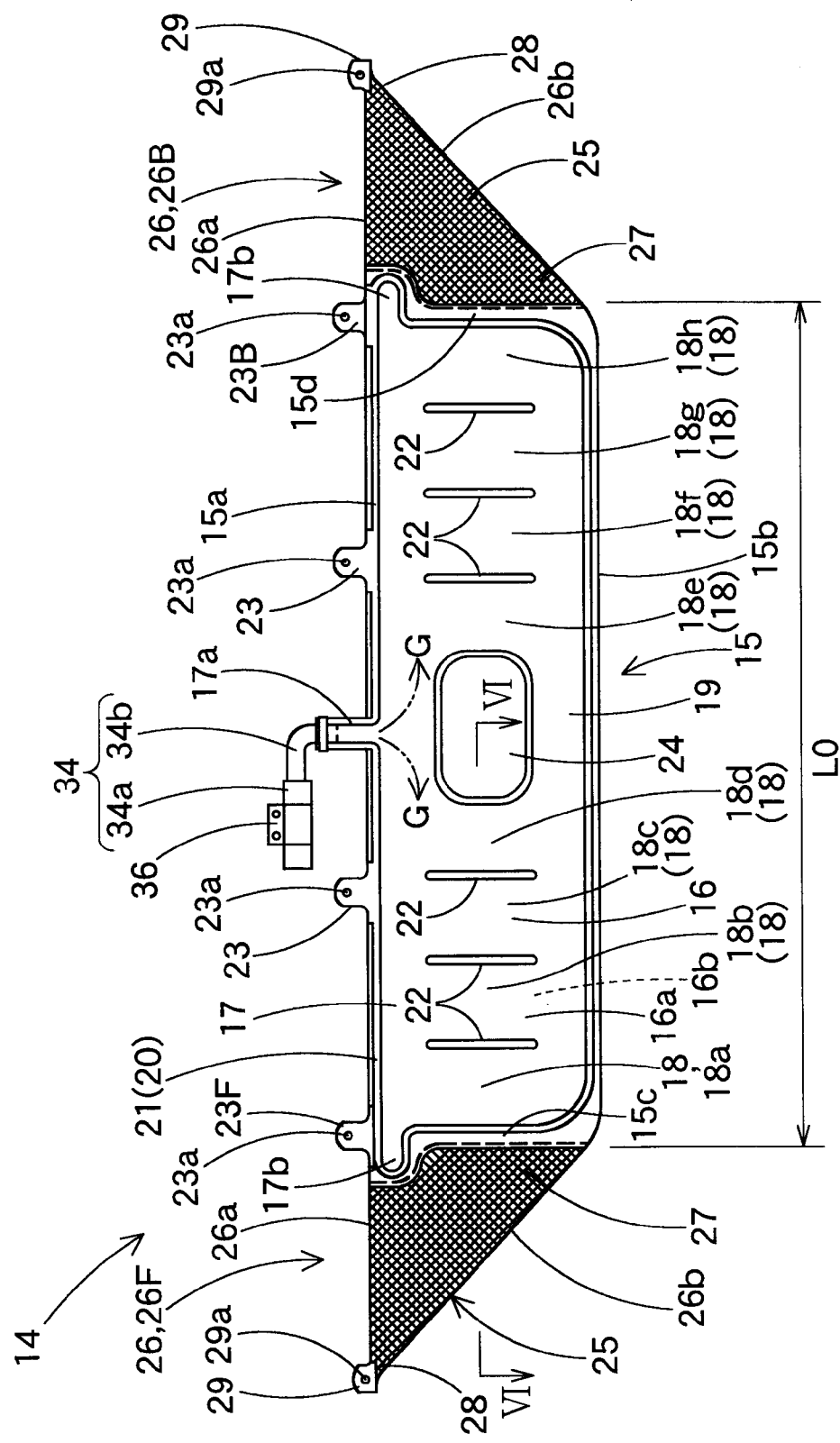
FIG. 5 is a front view showing the state in which the airbag to be employed in the first embodiment is expanded flat.
Figure 6:
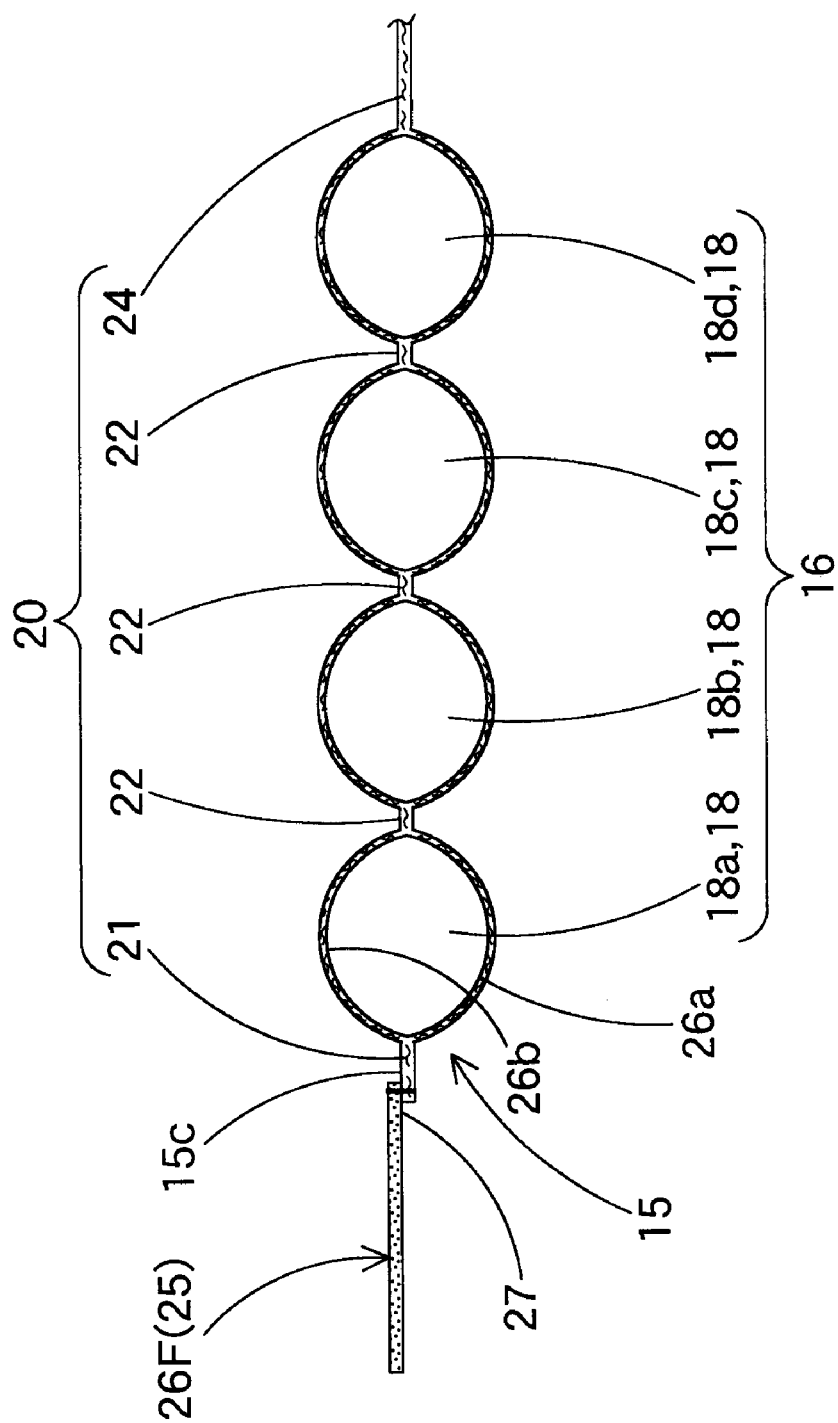
FIG. 6 is a transverse section showing an inflated state of the airbag of the first embodiment and taken along arrows VI—VI of FIG. 5.

Moreover, the airbag 14 is constructed, as shown in FIGS. 1 and 5, to include a body portion 15 and extension portions 26 (26F and 26B). The body portion 15 covers the inner side of the center pillar portion CP and the inner sides of the side windows SW1 and SW2. The extension portions 26 are arranged on the two longitudinal ends of the body portion 15. Each extension portion 26 covers about one half of the inner side of the front window FW or the rear window RW on the side of the vehicle side VS. The extension portion 26F or 26B is formed into a flexible sheet shape. The extension portion 26F or 26B extends inwards generally perpendicular to the side windows SW1 and SW2. Moreover, the front extension portion 26F is arranged, when the airbag 14 is extended and expanded, in front of a front passenger MF on the front seat. The back extension portion 26B is arranged, when the airbag 14 is extended and expanded, on the rear of a passenger MB of the back seat.

In the case of this embodiment, the body portion 15 is hollow weaving with yarns of polyester or polyamide. This body portion 15 is provided with a gas inflow portion 16 and a non-inflow portion 20. The gas inflow portion 16 is so expanded when it is fed with an expanding gas G from the inflator 34 that its inner side wall portion 16a and its outer side wall portion 16b may separate from each other. The non-inflow portion 20 does not admit the inflating gas G.

Here, the gas inflow portion 16 is so manufactured that it may keep its internal pressure, i.e., its expanded state for a time period of 5 seconds or more after its expansion is completed.

The gas inflow portion 16 is provided with a plurality of expansion portions 18, a gas distributing passage portion 17 and a communication portion 19. The expansion portions 18 are longitudinally juxtaposed by regulation portions 22 belonging to the non-inflow portion 20. The gas distributing passage portion 17 is a portion for distributing the inflating gas G from the inflator 34 to the individual expansion portions 18.

The gas distributing passage portion 17 is arranged to extend longitudinally along the upper end 15a of the body portion 15 and to communicate with the upper ends of individual expansion portions 18 (i.e., 18a, 18b, 18c, 18d, 18e, 18f, 18g and 18h). In the vicinity of the longitudinal central portion of the gas distributing passage portion 17, there is protruded upward an inlet portion 17a which has a generally cylindrical shape. This inlet portion 17a is connected to the inflator 34. On the two longitudinal ends of the gas distributing passage portion 17, moreover, there are arranged extended inflow portions 17b and 17b. These extended inflow portions 17b and 17b enter slightly into the upper ends of the extension portions 26F and 26B. The extended inflow portions 17b and 17b push and open the door portions 9 and 10 of a roof head lining 7 easily when the airbag 14 expands. Therefore, the individual extension portions 26F and 26B can smoothly protrude downward.

The individual expansion portions 18 communicate at their upper ends with the gas distributing passage portion 17 and at their lower ends with one another through the communication portion 19. This communication portion 19 is arranged to extend longitudinally on the side of the lower end 15b of the body portion 15. Here, the two expansion portions 18 (i.e., 18d and 18e) across the plate portion 24 of the non-inflow portion 20 are caused to communicate with each other through the communication portion 19. These expansion portions 18 are expanded into such column shapes as extend vertically. Because of these expansion portions 18, the body portion 15 has a smaller longitudinal length L1 when completely expanded than a length L0 when extended flat but not expanded.

In the embodiment, moreover, the front four expansion portions 18 (i.e., 18a, 18b, 18c and 18d) cover the inner side of the side window SW1 by the front seat and the inner side of the front part of the center pillar portion CP. The rear four expansion portions 18 (i.e., 18e, 18f, 18g and 18h) cover the inner side of the side window SW2 by the back seat and the inner side of the rear part of the pillar portion PP.

The non-inflow portion 20 is provided with a peripheral edge portion 21, a plurality of regulating portions 22, a plurality of mounting portions 23 and a plate portion 24. The peripheral edge portion 21 is arranged around the gas inflow portion 16. The regulating portions 22 are formed into the shape of a vertical line. These regulating portions 22 are formed to define the individual expansion portions 18 thereby to substantially equalize the thickness of the gas inflow portion 16 expanded. The individual mounting portions 23 are extended above the peripheral edge portion 21 on the upper edge 15a of the body portion 15. The plate portion 24 is arranged in a generally rectangular shape between the expansion portions 18d and 18e. The peripheral edge portion 21 is also arranged around the plate portion 24. The peripheral edge portion 21, the regulating portions 22 and the mounting portions 23 are finely woven. The plate portion 24 is coarsely woven because it does not contact directly with the gas inflow portion 16.

The plate portion 24 is arranged to maintain the entire shape of the body portion 15 and to reduce the volume of the gas inflow portion 16. In the embodiment, the plate portion 24 covers the vicinity of the rear part of the center pillar portion CP and the vicinity of the front part of the rear side window SW2 when the airbag is expanded.

Figure 3:
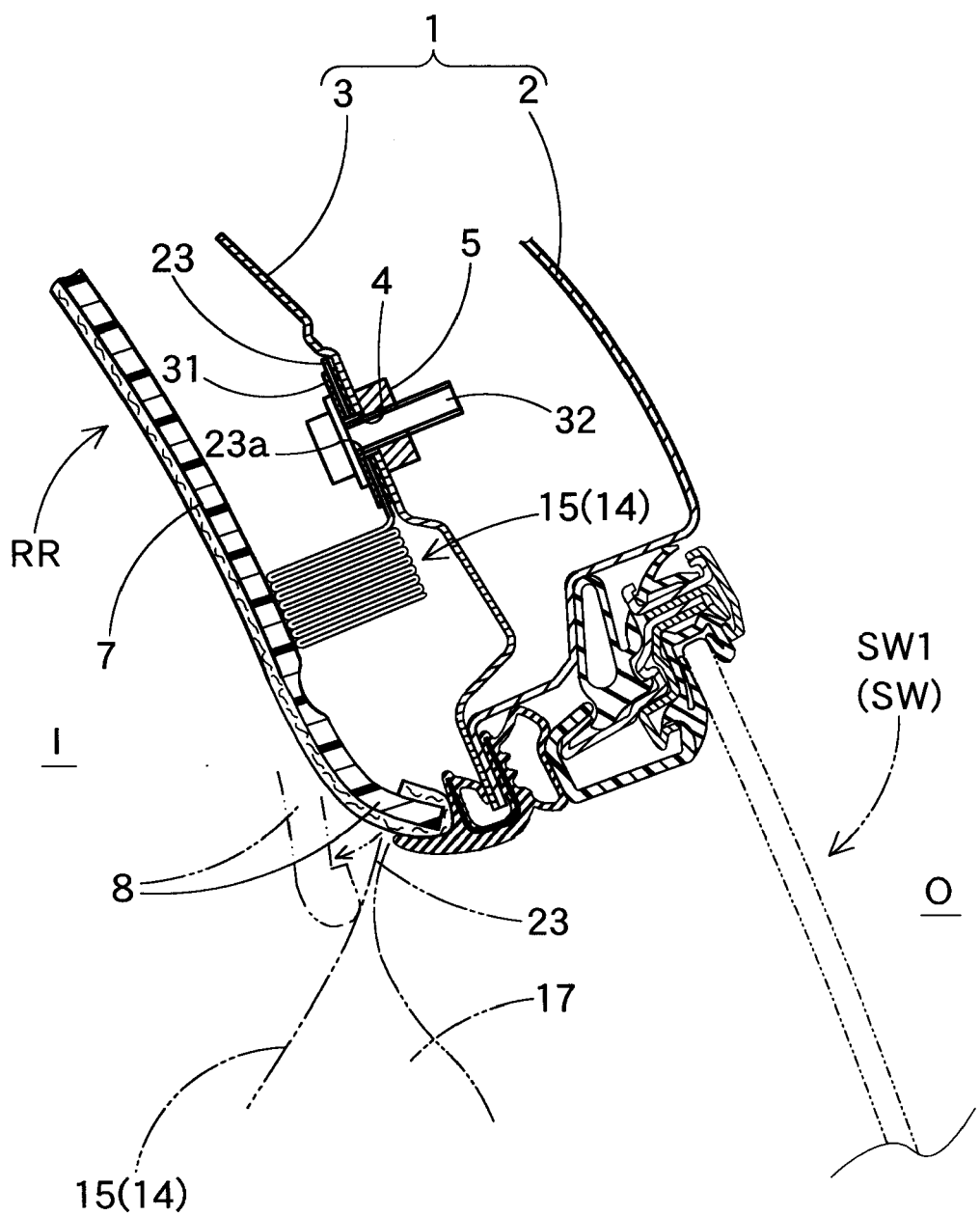
FIG. 3 is an enlarged schematic section of a portion taken along arrows III—III of FIG. 1.

The individual mounting portions 23 are individually provided with mounting holes 23a for receiving mounting bolts 32, for mounting the body portion 15 on an inner panel 3 (as referred to FIG. 3). This inner panel 3 is a member of the body 1 of the vehicle V1. To each mounting portion 23, as shown in FIG. 3, there is applied a mounting bracket 31 acting as a contact plate. The mounting portion 23 is fixed together with the mounting bracket 31 on the inner panel 3 above the upper edges of the side windows SW1 and SW2. In short, the mounting portion 23 is fixed on the inner panel 3 of a roof side rail portion RR on the vehicle body 1. Moreover, each mounting portion 23 is mounted on the inner panel 3 above the upper end 15a of the body portion 15 so that the lower edge 15b of the body portion 15 becomes free to move. In other words, the lower edge 15b of the body portion 15 can rock toward the inside of the cabin I or the outside O of the vehicle body generally perpendicular to the side windows SW1 and SW2. Moreover, each mounting portion 23 is made vertically longer than mounting portions 29 on the extension portions 26F and 26B. This is because the vicinity of the gas distributing passage 17 of the body portion 15 may protrude downward from a door portion 8 of the roof head lining 7 when the body portion 15 completes its expansion.

Figure 2:
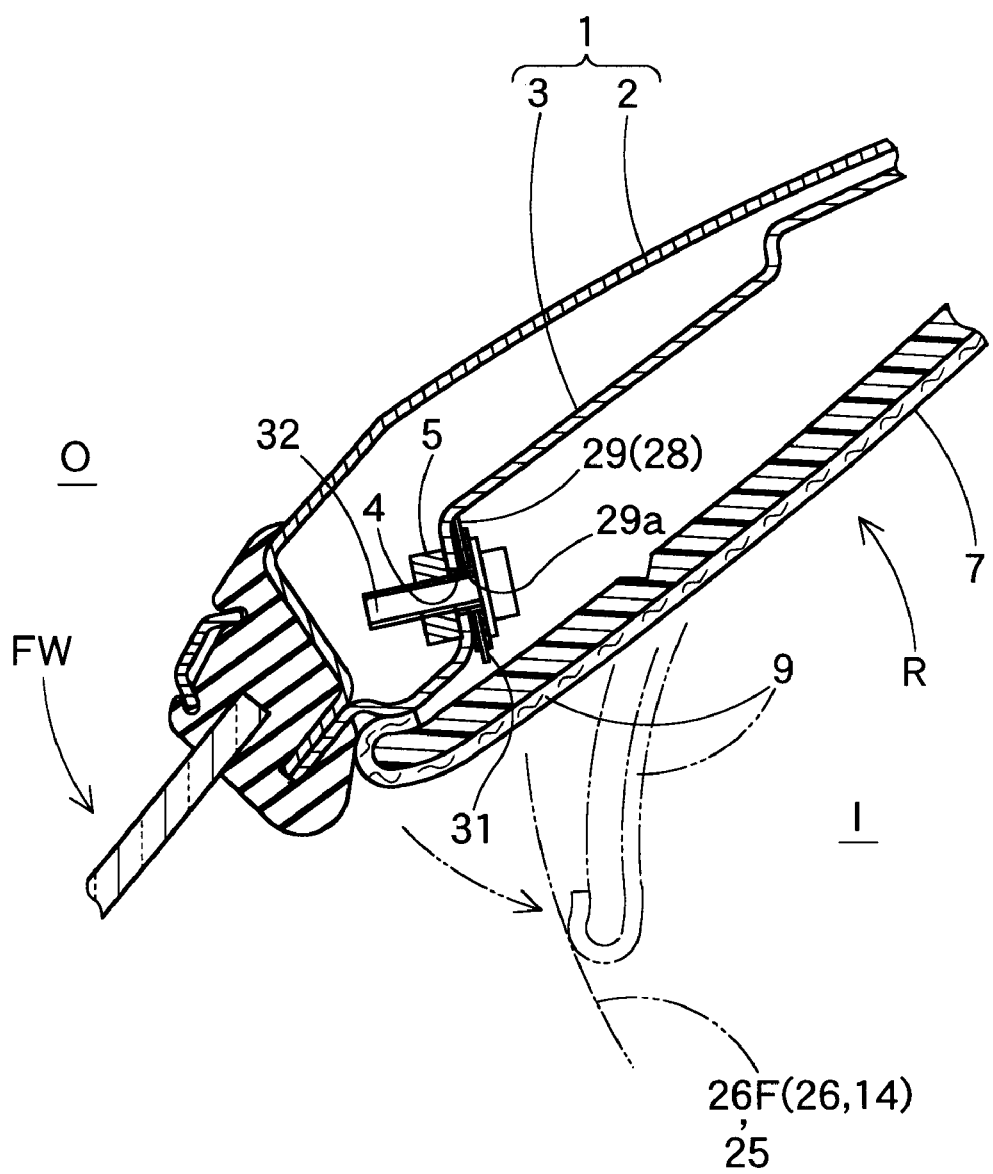
FIG. 2 is an enlarged schematic section of a portion taken along arrows II—II of FIG. 1.

Here, a mounting portion 23F at the front end is fixed on the inner panel 3 over the front pillar FP. A mounting portion 23B on the rear end side is fixed on the inner panel 3 over the rear pillar portion RP. Moreover, a member designated by 2 in FIGS. 2 and 3 is an outer panel on the vehicle body 1. Furthermore, the inner panel 3 has a plurality of mounting holes 4. A nut 5 for the bolt 32 is attached in the periphery of each mounting hole 4.

The individual extension portions 26F and 26B are so protruded into a generally right triangle shape that their leading end portions 28 are narrowed from the two longitudinal ends 15c and 15d of the body portion 15. The leading end portions 28 of the individual extension portions 26F and 26B are located at opposite ends apart from the body portion 15. The root portions 27 of the individual extension portions 26F and 26B are located on the sides close to the body portion 15. The root portions 27 and 27 of the individual extension portions 26F and 26B are individually extended along substantially the whole vertical length of the front and rear ends 15c and 15d of the body portion 15. When the individual extension portions 26F and 26B are extended flat together with the body portion 15, more specifically, their upper edges 26a extend longitudinally in parallel with the upper end 15a of the body portion 15, and their lower edges 26b extend as hypotenuses obliquely upward from the lower end 15b of the body portion 15. In the embodiment, moreover, the individual extension portions 26F and 26B are formed by stitching mesh materials 25 to the front and rear end portions 15c and 15d of the body portion 15. The mesh materials 25 are so woven of polyamide or polyester yarns into a flexible sheet shape as to have a number of small through holes or openings.

At the leading end portion 28 of each of the extension portions 26F and 26B, moreover, there is formed the mounting portion 29 which is protruded upward (as referred to FIG. 2). This mounting portion 29 is formed into a generally rectangular plate shape which has a mounting hole 29a for inserting the bolt 32 therethrough. These mounting portions 29 fix the mounting brackets 31, too. Moreover, the individual mounting portions 29 are fixed on the inner panel 3 on the side of the body 1 by the bolts 32. Still moreover, the mounting portion 29 of the front extension portion 26F is fixed in the vicinity of the transverse center of roof portion R on the upper edge of the front window FW.

In the airbag 14 of the embodiment, the body portion 15 is folded up and is housed across the center pillar portion CP above the upper edges of the side windows SW1 and SW2 of the inside of the vehicle. Moreover, the body portion 15 thus housed is covered with the door portion 8 of the roof head lining 7. This roof head lining 7 covers the inner side of the roof portion R. The door portion 8 is formed on the lower edge of the roof head lining 7 located in the roof side rail portion RR. On the other hand, the front extension portion 26F is folded up and is housed in the region from over the front pillar portion FP and to over the portion of the vehicle body in front of the passenger MF in the front seat. In the embodiment, more specifically, the front extension portion 26F is housed from the vicinity over the pillar portion FP to the upper edge of the front window FW in the roof portion R. The front extension portion 26F housed is covered with the door portion 9. This door portion 9 is arranged on the lower edge of the roof head lining 7 at the front side of the roof portion R. The back extension portion 26B is folded up and is housed from the top of the rear pillar portion RP to over the rear of the passenger MB in the back seat. In the embodiment, more specifically, the back extension portion 26B is housed from the vicinity over the pillar portion RP to the upper edge of the rear window RW in the roof portion R. The back extension portion 26B housed is covered with the door portion 10. This door portion 10 is arranged on the lower edge of the roof head lining 7 at the rear side of the roof portion R. The individual door portions 8, 9 and 10 comprise an airbag cover 12 for covering the airbag 14 when folded and housed. Moreover, the individual door portions 8, 9 and 10 are pushed by the airbag 14 when it expands, so that they are opened into the inside of the cabin I while moving their lower edges.

The inflator 34 is constructed to include a body portion 34a and a tube joint portion 34b. The body portion 34a is formed into a cylindrical shape. The tube joint portion 34b is formed into such a bent pipe shape to be jointed to the body portion 34a as to guide the inflating gas G (as referred to FIG. 5), as discharged from the body portion 34a, into the inlet portion 17a of the airbag 14. The inflator 34 is held in a mounting bracket 36 for clamping the outer circumference of the body portion 34a. By using bolts 37 to fix the bracket 36 on the inner panel 3, moreover, the inflator 34 is fixed on the inner panel 3 in the vicinity over the center pillar portion CP. Here, the lower end of the joint tube portion 34b is inserted into the inlet portion 17a and is fastened to communicate with the inlet portion 17a by a (not-designated) fastening member such as a clamp.

The inflator 34 is electrically connected through not-shown leads wire with a control unit 40 and is activated by inputting thereto an action signal from the control unit 40. This control unit 40 outputs the action signal to the inflator 34 when it receives a signal from a rollover sensor 41 or a side collision sensor 42. The rollover sensor 41 detects a side roll or a rollover of the vehicle V1. The side collision sensor 42 detects a side collision of the vehicle V1.

Here will be described how to mount the head protecting airbag device M1 of the first embodiment on the vehicle V1.

First of all, the airbag 14 is manufactured by stitching and connecting the front and back extension portions 26F and 26B to the hollow woven body portion 15. Next, the airbag 14 is extended flat, and the body portion 15 is accordion-folded together with the front and back extension portions 26F and 26B so as to bring the lower end 15b closer to the upper end 15a. Moreover, the airbag 14 is wrapped, after being folded, with breakable not-shown tape material so that it may stay folded.

Next, the individual mounting portions 23 and 29 of the airbag 14 are mounted on the mounting brackets 31. On the other hand, the inlet portion 17a is connected to the joint tube portion 34b of the inflator 34. Then, the mounting bracket 36 is mounted, on the inflator 34 to complete the airbag assembly.

After this, the individual mounting brackets 31 and 36 are fixed at the predetermined positions of the inner panel 3 by using the bolts 32 and 37, and the roof head lining 7 is mounted on the inner panel 3. As a result, the airbag 14 and the inflator 34 can be mounted on the vehicle V1.

Here, the control unit 40, the rollover sensor 41 and the side collision sensor 42 are separately mounted at the predetermined positions of the vehicle V1. When the head protecting airbag device M1 is mounted on the vehicle V1, moreover, the not-shown lead wires extending from the inflator 34 are connected with the control device 40.

After the head protecting airbag device M1 is mounted on the vehicle V1, moreover, the control device 40 inputs the rollover detection signal to predict a rollover or the like of the vehicle V1, from the rollover sensor 41. Then, the control device 40 activates the inflator 34. Moreover, the inflator 34 discharges the inflating gas. At this time, the airbag 14 admits the inflating gas from the inlet portion 17a into the gas distributing passage portion 17, and distributes the gas from the gas distributing passage portion 17 into the individual expansion portions 18. Therefore, the body portion 15 of the airbag 14 expands and breaks the not-shown tape material. Then, the body portion 15 pushes and opens the door portion 8 of the roof head lining 7 and expands while extending downward from the upper edges of the side windows SW1 and SW2. As a result, the body portion 15 covers the inner sides of the side windows SW1 and SW2 and the center pillar portion CP. On the other hand, the front and back extension portions 26F and 26B are pulled by the body portion 15 to open the individual door portions 9 and 10 and to protrude downward from the roof portion R that had housed them. As a result, the front extension portion 26F is so arranged in front of the passenger MF in the front seat as to cover the front window FW, and the back extension portion 26B is so arranged on the back side of the passenger MB in the back seat as to cover the rear window RW.

Figure 8A:
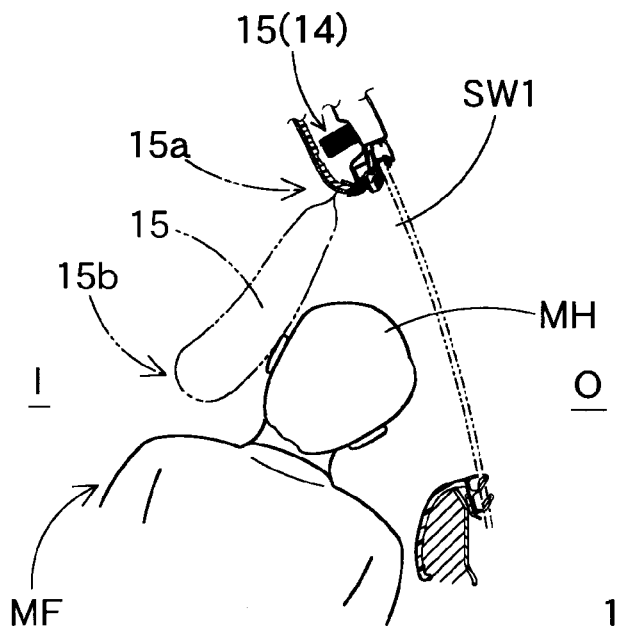
FIGS. 8A to 8C are diagrams for explaining the behaviors of the airbag at the time when the vehicle is rolled sides in the first embodiment.
Figure 8B:
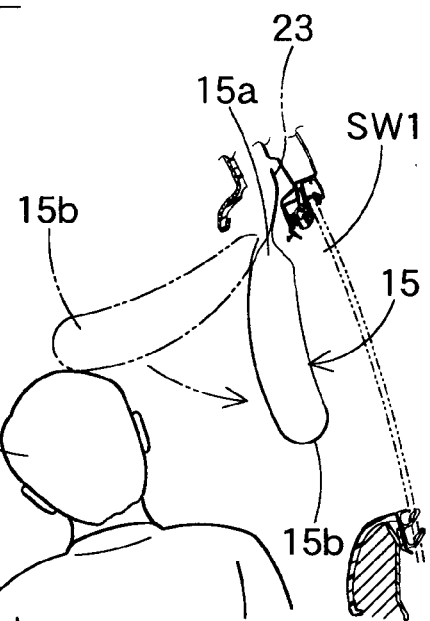
Figure 8C:
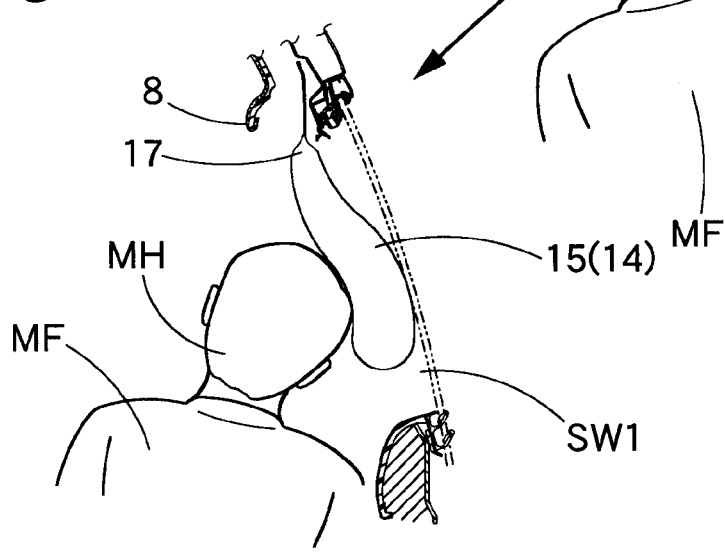

At this time, the passenger MF in the front seat may be close to the side window SW1, as shown in FIG. 8A. Even if the body portion 15 of the airbag 14 is arranged on the side of the head MH of the passenger MF in the front seat toward the center of the cabin I at the beginning of the expansion, its lower end 15b can move generally perpendicular to the side window SW1. Therefore, the body portion 15 after completing its expansion will not press the head MH of the passenger MF onto the side window SW1. If the vehicle V1 rolled over, on the contrary, the passenger MF in the front seat may move toward the inside of the cabin I away from the side window SW1. At this time, the airbag body portion 15 may be pushed by the passenger MF moving toward the inside of the cabin I or may move the lower end 15a toward the inside of the cabin I by its own inertial force. When the body portion lower end 15b then moves over the passenger's head MH, the body portion 15 returns toward the outside O, as shown in FIG. 8B, so that it enters the space between the passenger MF and the side window SW1. When the airbag body portion 15 is then sandwiched between the passenger's head MH and the side window SW1, it can restrain (or protect) the passenger's head MH properly. This mode becomes the same also to the passenger MB in the back seat.

Here, the extension portions 26F and 26B of the airbag 14 are made flexible. Even if these extension portions 26F and 26B fix the leading end portions 28 removed from the body portion 15, on the inner panel 3 of the vehicle body 1, therefore, the airbag body portion 15 when completely expanded can rock its lower end 15b freely by flexing the extension portions 26F and 26B. Moreover, the body portion 15 can move its lower end 15b smoothly toward the inside of the cabin I and can return smoothly toward the outside O.

In the first embodiment, moreover, when the airbag 14 completes its expansion, the front extension portion 26F is arranged in front of the passenger MF in the front seat. In this front extension portion 26F, the leading end portion 28 removed from the body portion 15 is fixed on the inner panel 3 of the vehicle body 1, and the root portion 27 of the extension portion is connected to the airbag body portion 15. Therefore, it is hard for the front extension portion 26F to move to the front. As a result, the front extension portion 26F can restrain (or protect) the passenger's head MH, even if this head MH moves forward while being arranged on the side of the airbag body portion 15 toward the center of the cabin I.

According to the head protecting airbag device M1 of the first embodiment, therefore, even if the passenger MF comes close to the side window SW1, the expanded airbag 14 can be smoothly arranged between the passenger MF and the side window SW1. Even if the passenger MF moves forward, moreover, the airbag 14 can restrain the passenger MF smoothly.

In the first embodiment, moreover, the control device 40 activates the inflator 34 to expand the airbag 14, too, even when it receives the detection signal from the side collision sensor 42 having detecting the side collision of the vehicle V1. Therefore, actions and effects similar to the aforementioned ones can also be attained at the time of a side collision of the vehicle V1.

In the first embodiment, moreover, the front extension portion 26F of the airbag 14 extends from along substantially the whole vertical length of the front end 15c of the body portion 15. Therefore, the root portion 27 in the vicinity of the boundary between the extension portion 26F and the body portion 15 has a wide area so that the extension portion 26F can restrain over a wide area. As a result, the front extension portion 26F can improve the restraining of the passenger MF moving forward.

In this head protecting airbag device M1, moreover, the front extension portion 26F of the airbag 14 is formed into such a mesh shape as can retain forward visibility. Even when the airbag 14 completes its expansion so that its front extension portion 26F is arranged in front of the passenger MF in the front seat, its mesh shape can retain the forward visibility. As a result, the passenger MF can grasp the surrounding situations easily. Here, this mesh shape structure can include a net shape and a lattice shape, and the extension portion 26F can restrain the passenger MF moving forward and can retain the forward visibility.

Without taking the aforementioned points into consideration, it is quite natural that the extension portion 26F may be formed into a sheet shape having flexibility but not visibility.

Here in the airbag device M1 of the embodiment, the back extension portion 26B is also formed into the mesh shape so that it can retain a backward visibility.

Figure 10:
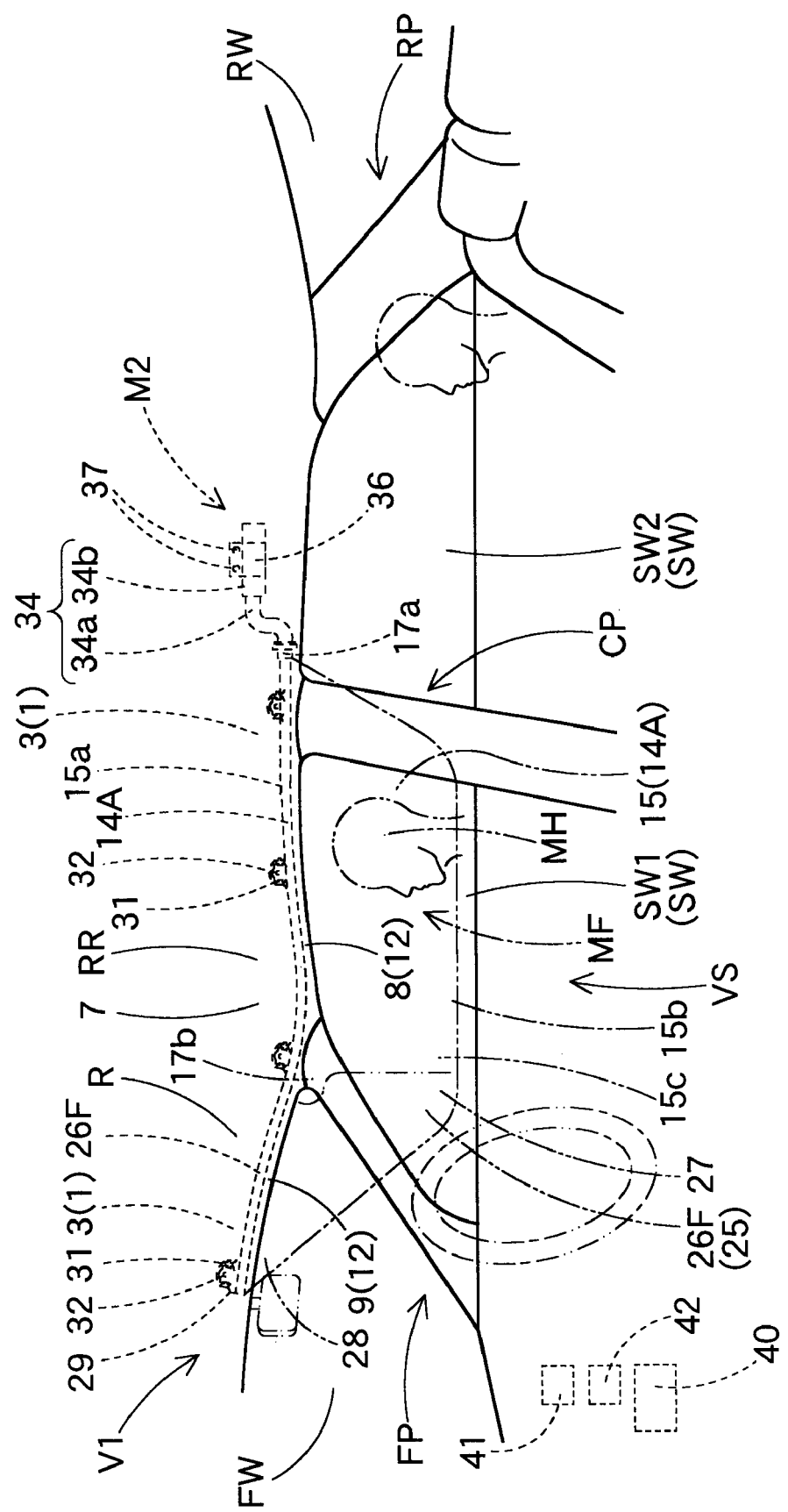
FIG. 10 is a front view taken from the inside of a vehicle and showing the used mode of a head protecting airbag device according to a second embodiment.

From the viewpoint of only the restraining performance on the front side, on the other hand, an airbag 14A having the back extension portion 26B omitted may be employed in a head protecting airbag device M2 according to a second embodiment, as shown in FIG. 10. Here, the airbag device M2 is substantially different from the airbag device M1 only in that the back extension portion 26B is omitted from the airbag 14A. In the airbag device M2, moreover, the remaining portions and members are similar to those of the first embodiment so that their description will be omitted by designating the similar portions and members by the common reference numerals.

Figure 7:
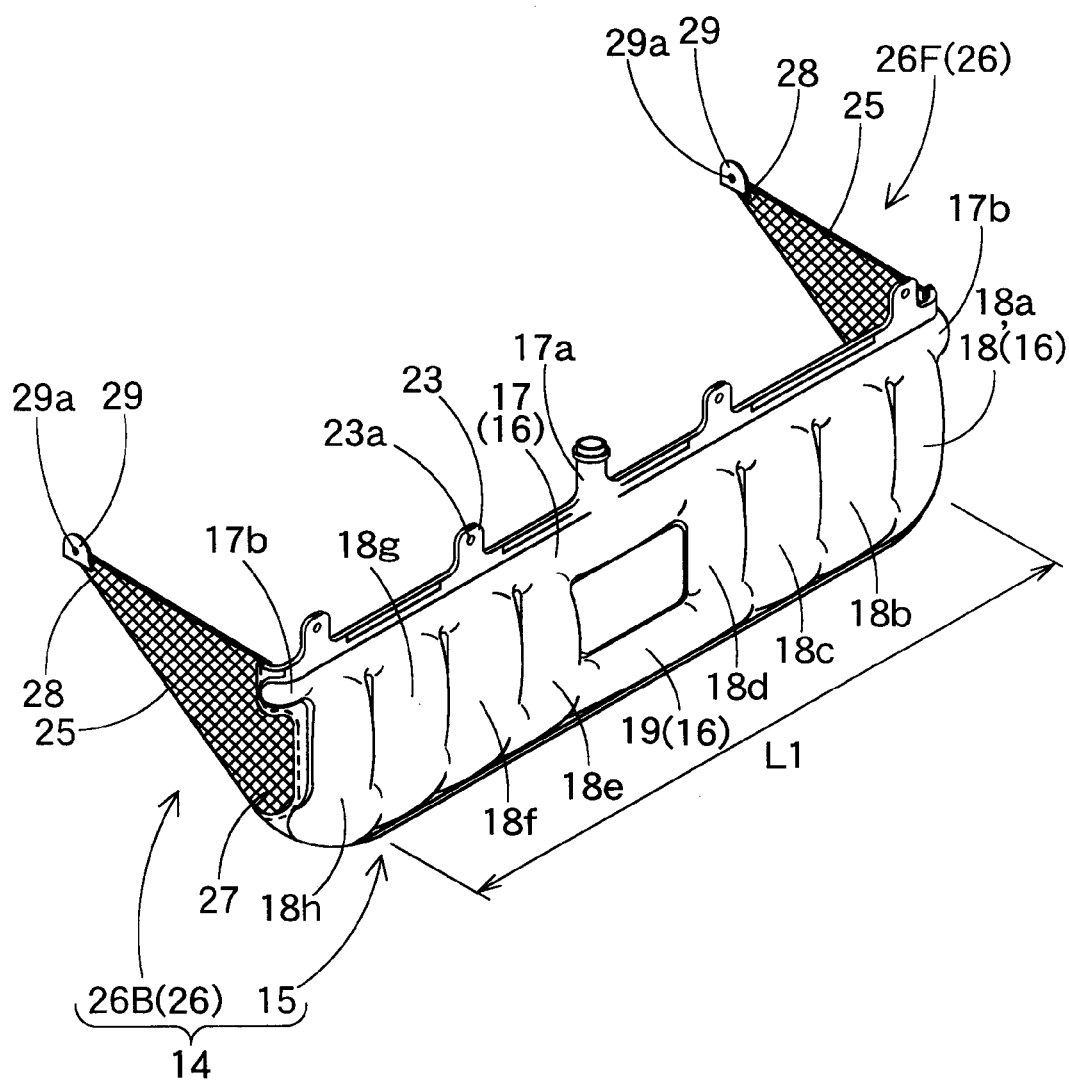
FIG. 7 is a schematic perspective view showing the inflated state of the airbag of the first embodiment being mounted on the vehicle.

In the head protecting airbag device M1 of the first embodiment, moreover, the airbag body portion 15 expands such that its length is made smaller than that of the extended but non-expanded state, namely, such that the length is reduced from the value L0 to the value L1. Moreover, the leading end portion 28 of the extension portion 26F extended from the front end 15c of the body portion 15 is fixed on the inner panel 3 of the body 1. As shown by solid lines in FIGS. 7 and 9, therefore, the body portion 15 and the extension portion 26F upon completion of the expansion take such a shape similar to about one quarter of a cylinder as to enclose the passenger MF. Moreover, the body portion 15, as arranged on the side of the outside O of the passenger MF, is hard to move toward the outside O even if it is pushed by the passenger MF moving toward the outside O. As a result, the airbag 14 can restrain the passenger MF on the side of the inside of the cabin I of the body portion 15 or the extension portion 26F.

Figure 9:
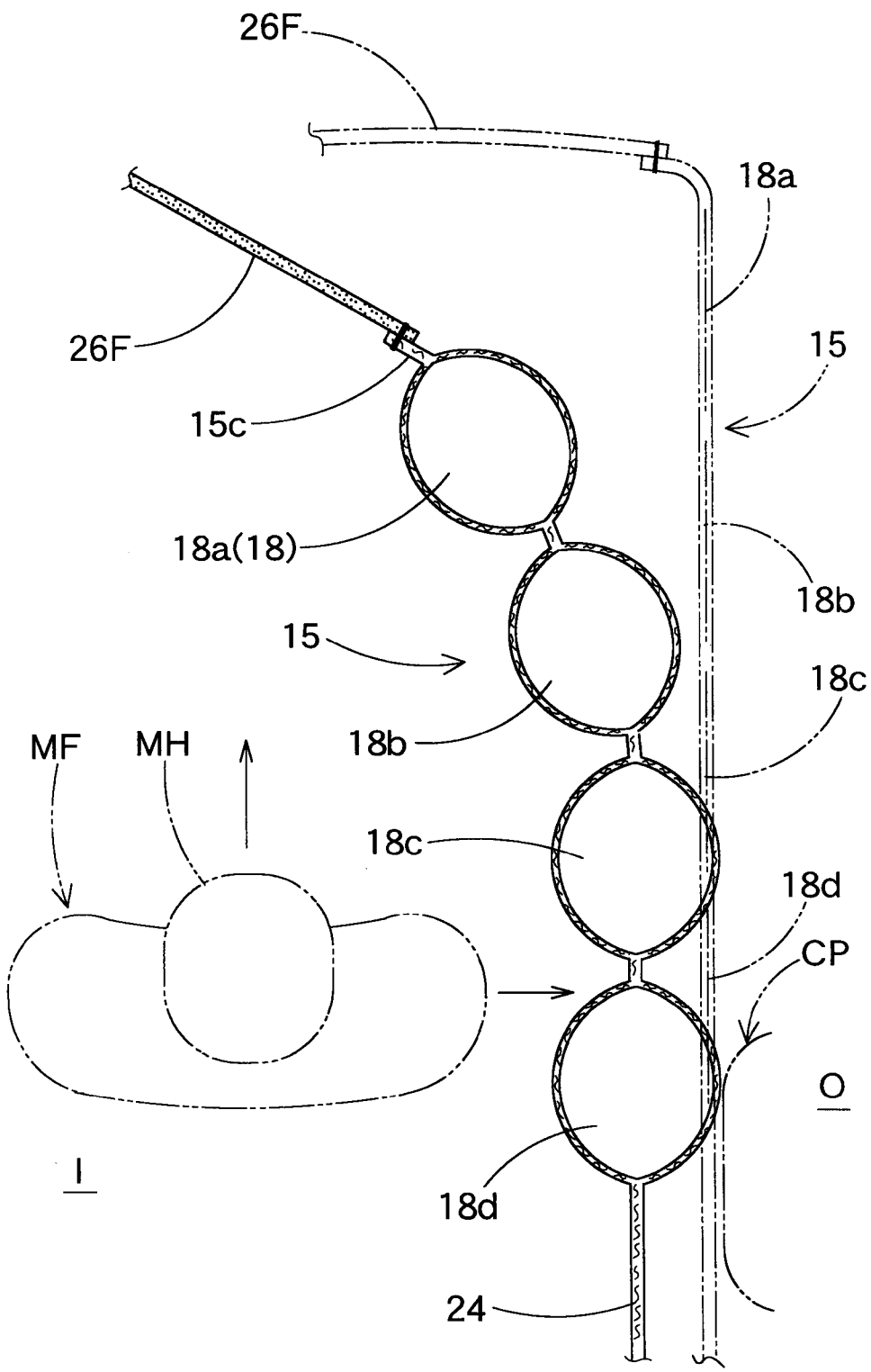
FIG. 9 is a horizontal section of a front side portion showing the inflated state of the airbag of the first embodiment being mounted on the vehicle.

Here, double-dotted lines in FIG. 9 show the state in which the airbag body portion 15 is extended in the non-expanded state. In this state, the airbag body portion 15 and the extension portion 26F are arranged generally at a right angle with respect to each other. In the first embodiment, however, the airbag body portion 15 becomes shorter, as shown by the solid lines in FIG. 9, as it is expanded. Moreover, the body portion 15 and the extension portion 26F upon completion of the expansion take the state similar to about one quarter of a cylinder to enclose the passenger MF.

In case the airbag body portion 15 is so constructed that the length L1 upon completion of the expansion is shorter than that L0 in the extended but non-expanded state, the aforementioned actions and effects can be attained if the extension portion 26 is arranged on at least one longitudinal end of the body portion 15. Therefore, the airbag may be constructed by omitting the back extension portion 26B (as referred to FIG. 10) or by omitting the front extension portion 26F.

In the head protecting airbag device M1 of the first embodiment, however, the front and back extension portions 26F and 26B are arranged on the two longitudinal ends 15c and 15d of the body portion 15. In the body portion 15 which has completely expanded, moreover, the two longitudinal ends 15c and 15d are supported by the front and back extension portions 26F and 26B extending toward the vehicle inside. Therefore, the body portion 15 arranged on the outside O of the passengers MF and MB more hardly moves toward the outside O even if it is pushed by the passengers MF and MB moving toward the outside O. Therefore, the airbag device M1 is improved in the performance to restrain the passengers MF and MB.

In order to make the length L1 of the airbag body portion 15 when completely expanded smaller than the length L0 in the extended but non-expanded state, the expansion portions 18 for completing the expansion in the vertical rod shape are juxtaposed in plurality in the longitudinal direction. However, the action to reduce the length at the expanding time can be obtained if the airbag body portion 15 is constructed by arranging at least one vertically extending expansion portion 18. If the expansion portions 18 to complete the expansions in the vertical rod shapes as in the embodiment are juxtaposed longitudinally in plurality, however, the body portion having been expanded can make the length smaller. Moreover, the body portion 15 can be prevented from moving toward the outside O.

Figure 11:
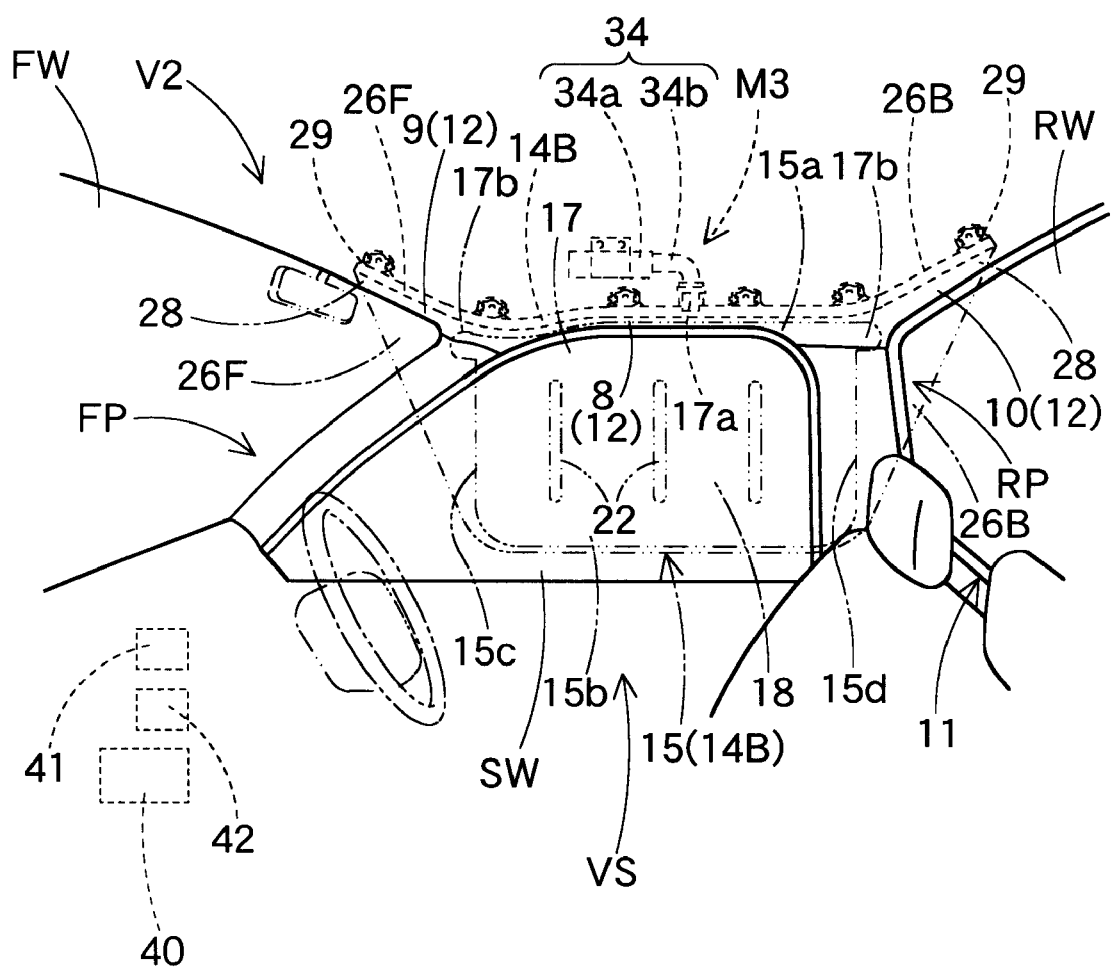
FIG. 11 is a front view taken from the inside of a vehicle and showing the used mode of a head protecting airbag device according to a third embodiment.

Moreover, the head protecting airbag device using the airbag which is constructed by arranging the extension portion on at least one longitudinal end of the airbag body portion may be modified, as shown in FIG. 11. FIG. 11 shows a head protecting airbag device M3 according to a third embodiment. This airbag device M3 is mounted on a vehicle V2 such as a single-cab vehicle having one row of seats, in which the side windows SW are arranged individually on the transverse side faces VS of the vehicle. In an airbag 14B of this airbag device M3, the airbag body portion 15 is so arranged as to cover at least one transverse side window SW in the vehicle V2 such as the single-cab vehicle. Here, this airbag device M3 of the third embodiment is different from that of the first embodiment in the vehicle V2 to mount the airbag device and in that the length of the airbag body portion 15 is set smaller. In the airbag device M3, however, the remaining portions and members are similar to those of the first embodiment so that the common portions and members will be designated by the same reference numerals as those of the first embodiment.

Moreover, this airbag 14B of the third embodiment is also provided with the back extension portion 26B. Moreover, the leading end portion 28 of the back extension portion 26B is fixed on a rear wall portion 11 of the rear panel of the body 1, extending generally at a right angle with respect to the side window SW, at the vicinity of the transverse center above the upper edge of the rear window RW.

In passing, the airbag device M1 of the first embodiment is mounted on the vehicle V1 which is provided with the generally vertically extending pillar portion CP and which has the side windows SW1 and SW2 across the pillar portion CP. In the airbag device M1 of the first embodiment, moreover, the body portion 15 of the airbag 14 is arranged, upon completion of the expansion, to cover the side windows SW1 and SW2 across the pillar portion CP. In other words, the airbag body portion 15 is restrained by the pillar portion CP, too, from moving toward the outside O. In the first embodiment, therefore, the airbag 14 is hard to move toward the outside O when pushed by the passengers MF and MB moving toward the outside O, even if it is enlarged in the longitudinal direction. As a result, the airbag 14 improves its ability to restrain the passengers MF and MB.

In the head protecting airbag device M1 of the first embodiment, moreover, the airbag 14 is so housed that the body portion 15 is covered with the door portion 8 of the roof head lining 7 above the upper edges of the side windows SW1 and SW2. Moreover, the front and back extension portions 26 attached to the two longitudinal ends 15c and 15d of the body portion 15 each are connected with the body portion 15 above the upper edges of the front window FW or the rear window RW adjoining the side windows SW1 and SW2. Moreover, the front and back extension portions 26 are housed and covered with the door portions 9 and 10 of the roof head lining 7 so that they can protrude downward. Therefore, the airbag 14 has an excellent appearance, when housed, on the inside of the cabin I.

As a special feature of the head protecting airbag device M1, the three windows FW, SW (i.e., SW1 and SW2) and RW of the front, sides and back of the inside can be covered with the airbag 14. In the airbag device M1, therefore, the performance of the airbag 14 to restrain the front and back passengers MF and MB within the inside of the cabin I can be improved while keeping the excellent state of the appearance of the inside of the cabin I.

It is natural that the airbag 14A is provided with only the front extension portion 26F or the back extension portion 26B as the extension portion 26, as in the second embodiment. This is because the body portion 15 is so housed, at the time of housing the airbag, that it is covered with the roof head lining 7 on the upper edge of the side window SW. Moreover, the extension portion 26F or the extension portion 26B is so housed and covered with the roof head lining 7 as to merge into the body portion 15 on the upper edge of the window FW or the window RW adjoining the side windows SW and to protrude downward. This construction improves the appearance of the housed airbag on the inside of the cabin I.

Here in the first embodiment, the airbag 14 has the extended inflow portions 17b which enter slightly into the upper end of the region of the extension portion 26 and expand by admitting the inflating gas. At the expanding time of the airbag 14, therefore, the extended inflow portions 17b expand to push and open the door portions 9 and 10 of the roof head lining 7 easily. As a result, the extension portions 26, arranged to curve toward the inside of the cabin I from the body portion 15, protrude smoothly downward.

In the first embodiment, moreover, the extension portions 26 are made separate of the airbag body portion 15 and are connected to the body portion 15 by stitching them. However, the extension portions 26 may also be made integral with the body portion 15. In this modification, the extension portions 26 may be hollow weaving integrally with the body portion 15.

Alternatively, the airbag 14 may also be manufactured without using the hollow weaving method. For example, the airbag 14 may also be manufactured by folding a sheet of flat cloth and by stitching, adhering or fusing the folded cloth at predetermined portions such as the peripheral edges to form the expansion portions 18. In this modification, the extension portions 26 may also be formed integrally with the body portion 15. Alternatively, the extension portions 26 may also be made separate of the body portion 15 and connected to the body portion 15 by stitching, adhering or fusing them or by using fixing means such as eyelets or rivets.

Here, the individual door portions 8, 9 and 10 of the roof head lining 7 may also be made separate of the portion covering the inner side of the roof portion R at other places.

Moreover, the individual door portions 8, 9 and 10 of the roof head lining 7 may also be so constructed that it may be opened by breaking their peripheries when they are pushed by the airbag 14, 14A or 14B.

Moreover, the positions of the individual door portions 8, 9 and 10 of the roof head lining 7 may be the positions of the extension portions 26 (i.e., 26F and 26B) and may be removed from the upper edges of the windows FW and RW on the inner side.

What is claimed is:

1. A head protecting airbag device comprising an airbag folded and housed above the upper edge of a window inside of a vehicle and expanded while being extended to cover the inner side of said window when it admits an inflating gas, wherein said airbag includes:
a body portion for covering the inner side of a side window positioned on the side face of the vehicle; and
a sheet-shaped flexible extension portion arranged on at least the front of said body portion and extending on the inner side generally perpendicular to said side window so that it can be arranged in front of a passenger when said airbag expands,
wherein said body portion fixes the upper edge upon completion of the expansion on the body side while allowing the lower edge upon completion of the expansion to move generally perpendicular to said side window, and
wherein said extension portion is fixed at its leading end, removed from said body portion, on the vehicle body and housed in a roof portion over the front side of the passenger such that it can protrude downward along with said body portion housed above the upper edge of said side window.

2. A head protecting airbag device according to claim 1, wherein said extension portion is formed to extend from substantially the whole vertical length of the front end of said body portion.

3. A head protecting airbag device according to claim 1, wherein said extension portion is formed into a mesh shape for retaining forward visibility.

4. A head protecting airbag device according to claim 1, wherein said body portion is constructed:
such that it is housed and covered with a door portion and extends when it admits the inflating gas pushing and thereby opens said door portion; and
such that it includes a gas inflow portion for admitting said inflating gas,
wherein said gas inflow portion includes a gas distributing passage portion extending longitudinally along the upper edge of said body portion for distributing said inflating gas inflow longitudinally of said body portion, and
wherein said body portion is fixed on said vehicle body so that it may protrude said gas distributing passage portion downward from said door portion upon completion of the expansion.

5. A head protecting airbag device according to claim 1, wherein said body portion includes a gas inflow portion for admitting said inflating gas, and
wherein said extension portion is housed and covered by a door portion that is opened by pushing, and includes at its upper edge an extended gas inflow portion which can open said door portion and which is extended from the gas inflow portion of said body portion, for pushing and opening said door portion when it admits said inflating gas.

6. A head protecting airbag device comprising an airbag folded and housed above the upper edge of a window inside of a vehicle and expanded while being extended to cover the inner side of said window when it admits an inflating gas, wherein said airbag includes:
a body portion for covering the inner side of a side window positioned on the side face of the vehicle; and
a sheet-shaped flexible extension portion arranged on at least one longitudinal end of said body portion, extending on the inner side generally perpendicular to said side window, and fixing its leading end removed from said body portion on the vehicle body,
wherein said body portion is fixed at its upper edge upon completion of the expansion on the vehicle body while allowing the lower edge upon completion of the expansion to move generally perpendicular to said side window, and wherein said body portion is constructed to have a smaller longitudinal length when it admits inflating gas than that of its extended but non-expanded state.

7. A head protecting airbag device according to claim 6, wherein said extension portions are arranged on each of the two longitudinal ends of said body portion.

8. A head protecting airbag device according to claim 7, wherein said vehicle is constructed to have said side window on each of the two transverse sides, and wherein said airbag body portion is constructed to cover at least one of the transverse sides of said vehicle.

9. A head protecting airbag device according to claim 6, wherein said vehicle is constructed to have a pillar portion extending generally vertically and to arrange said side windows in front of and to the rear of said pillar portion, and wherein said body portion is constructed to cover said side windows and said pillar portion between them.

10. A head protecting airbag device according to claim 6, wherein said body portion includes a gas inflow portion for admitting said inflating gas, and wherein said gas inflow portion is constructed to have a plurality of expansion portions of vertical rod shape juxtaposed longitudinally.

11. A head protecting airbag device according to claim 6, wherein said body portion is constructed:
  such that it is housed and covered with a door portion and expands, pushing and opening said door portion, when it admits the inflating gas; and
  such that it includes a gas inflow portion for admitting said inflating gas,
  wherein said gas inflow portion includes a gas distributing passage portion extending longitudinally on the upper edge of said body portion for distributing said inflating gas inflow longitudinally along said body portion, and
  wherein said body portion is so fixed on said vehicle body that it may protrude said gas distributing passage portion downward of said door portion upon completion of the expansion.

12. A head protecting airbag device according to claim 6, wherein said body portion includes a gas inflow portion for admitting said inflating gas, and wherein said extension portion is housed and covered by a door portion that is opened by pushing, and wherein said extension portion includes at its upper edge an extended gas inflow portion which can open said door portion and which is extended from the gas inflow portion of said body portion, for pushing and opening said door portion when it admits said inflating gas.

13. A head protecting airbag device comprising an airbag folded and housed above the upper edge of a window inside of a vehicle and expanded while being extended to cover the inner side of said window when it admits an inflating gas, wherein said airbag includes:
  a body portion for covering the inner side of a side window positioned on the side face of the vehicle; and
  a sheet-shaped flexible extension portion arranged on at least one longitudinal end side of said body portion, extending on the inner side generally perpendicular to said side window, and fixed at its leading end, removed from said body portion, on the vehicle body, and
  wherein said body portion is fixed at its upper edge upon completion of the expansion to the vehicle body while allowing the lower edge upon completion of the expansion to move generally perpendicular to said side window,
  wherein said body portion is housed, when said airbag is housed, so that it is covered with a roof head lining above the upper edge of said side window, and
  wherein said extension portion is housed, when said airbag is housed, so that it is covered with said roof head lining, can protrude downward, and is connected with said body portion above the upper edge of a window adjoining said side window.

14. A head protecting airbag device according to claim 13, wherein said extension portion is arranged on each of the two longitudinal ends of said body portion, wherein the front extension portion of said body portion is housed above the upper edge of a front window, and wherein the rear extension portion of said body portion is housed above the upper edge of a rear window.

15. A head protecting airbag device according to claim 13, wherein said body portion is constructed:
  such that it is housed and covered with a door portion and extends when it admits the inflating gas, pushing and opening said door portion; and
  such that it includes a gas inflow portion for admitting said inflating gas,
  wherein said gas inflow portion includes a gas distributing passage portion extending longitudinally on the upper edge of said body portion for distributing said inflating gas inflow longitudinally of said body portion, and
  wherein said body portion is so fixed on said vehicle body that it may protrude said gas distributing passage portion downward from said door portion upon completion of the expansion.

16. A head protecting airbag device according to claim 13, wherein said body portion includes a gas inflow portion for admitting said inflating gas, and wherein said extension portion is housed and covered by a door portion that is opened by pushing, and includes at its upper edge an extended gas inflow portion which can open said door portion and which is extended from the gas inflow portion of said body portion, for pushing and opening said door portion when it admits said inflating gas.

* * * * *